Patented Apr. 10, 1945

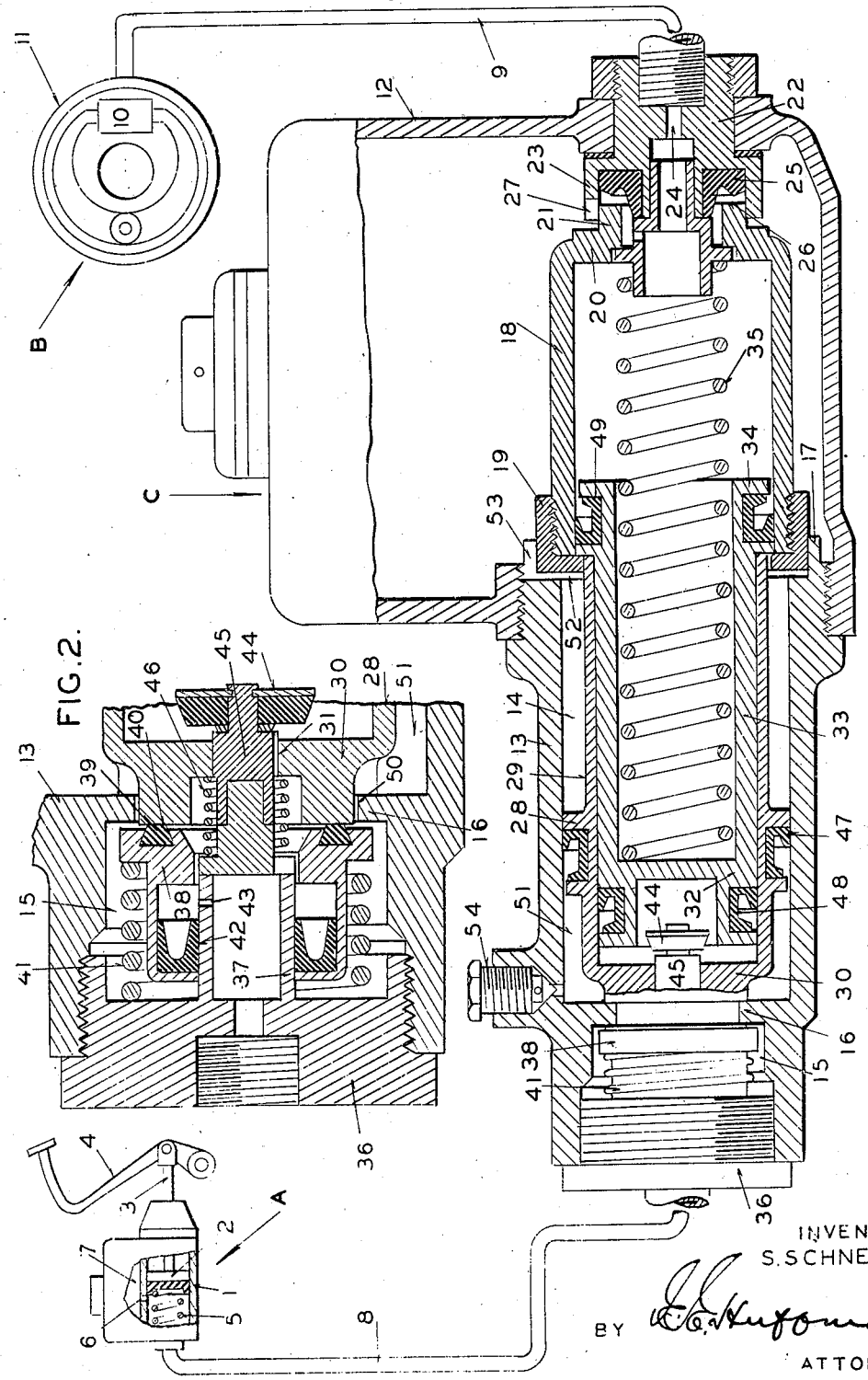

2,373,506

UNITED STATES PATENT OFFICE 2,373,506

FLUID PRESSURE COMPOUNDING SYSTEM

Steve Schnell, Kirkwood, Mo., assignor to Wagner Electric Corporation, St. Louis, Mo., a corporation of Delaware Application July 2, 1943, Serial No. 493,234

14 Claims. (Cl. 60—54.5)

My invention relates to fluid pressure systems and more particularly to an improved compounding means for embodiment therein.

One of the objects of my invention is to produce an improved fluid pressure compounding system which will permit a volume of displaced fluid under pressure to move a large volume of fluid until a predetermined pressure is reached and thereafter to move a smaller volume of fluid.

Another object of my invention is to associate means with a fluid pressure developing piston of a fluid pressure system whereby the piston will be moved by fluid pressure acting on a smaller area than the face of the piston until a predetermined pressure is reached and then the piston will be moved by fluid pressure acting on a larger area than the face of the piston.

Still another object of my invention is to produce an improved compounding unit which can be interposed between a master cylinder device and a fluid motor to be actuated.

Other objects of my invention will become apparent from the following description taken in connection with the accompanying drawing in which Figure 1 is a schematic view of a fluid pressure system embodying my invention, the compounding unit thereof being enlarged and shown in partial section; and Figure 2 is an enlarged sectional view of the pressure-operated valve structure and associated parts.

Referring to the figures in detail, I have shown my improved fluid pressure system as being employed as an actuating system for a brake but it is to be understood that it may be employed to operate any device desired. As shown, the system comprises essentially three units, a master cylinder device A, an actuated brake unit B, and a compounding unit C.

The master cylinder device A is of known construction and comprises a cylinder 1 having reciprocable therein a piston 2 connected by a piston rod 3 to an actuating pedal 4. The piston is normally held in its retracted position by a spring 5 where it uncovers a porthole 6 for placing the portion of the cylinder ahead of the piston in communication with the reservoir 7. The outlet of the master cylinder device is connected with one end of the compounding unit C by a conduit 8. The opposite end of the compounding unit C is connected by a conduit 9 with the fluid motor 10 for actuating the brake assemblies 11 (one only being shown).

The compounding unit C has a casing 12 which forms the reservoir for the unit. Screwed into the lower part of this casing is a second casing member 13 formed with a cylinder 14 and a compartment 15 between which is an annular wall 16. The inner end of member 13 is provided with an axially extending flange 17 for slidably supporting the rear end of a cylinder 18 positioned in casing 12, said cylinder 18 having a cap 19 received in flange 17. The forward end of cylinder 18 is formed with an inwardly extending wall 20 from which an annular flange 21 extends. This flange 21 is employed to slidably support the forward end of the cylinder on a plug 22 secured to the forward wall of casing 12, said plug having an annular flange 23 for receiving flange 21. The plug has connected thereto conduit 9 leading to the fluid motors and a passage 24 in the plug connects the conduit with the interior of cylinder 18. Plug 22 carries an annular yieldable valve element 25 which is adapted to be engaged by the end surface 26 on flange 21 in order to seal this flange with the plug so the fluid under pressure developed in the cylinder and transmitted to the fluid motors will not escape into reservoir casing 12. When cylinder 18 is positioned so that surface 26 is disengaged from the yieldable member 25, the interior of cylinder 18 can communicate with casing 12, this communication being facilitated by slots 27 in flange 23.

Cylinder 14 in the casing member 13, which is of larger diameter than cylinder 18, has mounted therein a piston member 28 provided with a cylinder 29. This piston is so formed as to provide an end wall 30 for the cylinder, which end wall has a portion projecting through wall 16 and an opening 31 to permit fluid to enter the cylinder. Within cylinder 29, which is of smaller diameter than cylinder 18, is a piston 32 integrally connected by a hollow portion 33 with a piston 34 mounted in cylinder 18. These pistons are normally biased by a spring 35 to their inoperative positions in the cylinders and when in these positions, piston 34 will abut against cap 19 of cylinder 18 and hold this cylinder in a position where the end surface 26 of flange 21 on the forward end of the cylinder is disengaged from the yieldable member 25. When in its retracted position, piston 34 also engages the end of cylinder 29 formed in piston 28 to thereby maintain the end wall 30 engaged with the annular wall 16 between cylinder 14 and chamber 15.

Chamber 15 has connected thereto conduit 8 leading from the master cylinder device, the connection being accomplished by means of a plug 36 screwed into the end of casing member 13. This plug is provided with a cylindrical extension 37 projecting into chamber 15 and mounted on the extenion is a cup-shaped member 38 carrying a sealing ring 39 for cooperation with end surface 40 on wall 30 of piston 28. The cup shaped member is acted on by a spring 41 to hold ring 39 in engagement with said surface. The interior of the cup-shaped member carries an annular packing cup 42 to prevent fluid from entering the portion of chamber 15 exterior to the cup-shaped member. The interior of the cup-shaped member communicates with the interior of the cylindrical extension 37 and conduit 8 by a small passage 43 in the cylindrical wall.

The opening 31 in wall 30 is adapted to be controlled by a valve element 44 carried on a valve stem 45, said valve stem being acted on by a spring 46 normally biasing valve element 44 to closed position. Valve element 44 will be normally held open by the engagement of stem 45 with the end of the cylindrical extension 37 whenever piston 28 is in its retracted position as shown in the figures.

The pistons 28, 32, and 34 carry suitable packing elements 47, 48, and 49, respectively, to prevent leakage past their peripheries. The portion of piston 28 which extends through wall 16 is provided with grooves 50 to permit fluid to flow into chamber 51 formed between piston 28 and wall 16 whenever piston 28 is in its retracted position. A groove 52 in cap member 19 and slots 53 in flange 17 permits interchange of fluid between the interior of casing 12 and cylinder 14 ahead of piston 28. A bleeder valve 54 permits air to be removed from chamber 51.

Referring to the operation, when the system is not being operated, the parts will be as shown in the figures. The piston of the master cylinder device will be in the retracted position uncovering porthole 6. The cylinder 18 of the compounding unit will be biased by spring 35 to the position where the interior of cylinder 18 is in communication with the interior of the reservoir casing 12. The pistons 28, 32, and 34 will also be held in their retracted positions by spring 35 and since piston 34 will abut the end of the cylinder in piston 28, the end wall 30 will project through wall 16 so that its surface 40 can be engaged by the yieldable ring 39 on the cup-shaped member 38 under the action of spring 41. The valve element 44 will be held open due to the engagement of stem 45 with the end of the cylindrical extension 37.

If the master cylinder device is now operated by actuating pedal 4, fluid under pressure will be developed after the piston passes porthole 6. This developed fluid pressure will be transmitted through conduit 8, the cylindrical extension 37, and into cylinder 29 ahead of piston 32, thereby moving this piston to the right as viewed in the figures. Fluid under pressure cannot act on piston 28 due to the fact that ring 39 of the cup-shaped member 38 engages surface 40 to seal off chamber 51. As piston 32 moves to the right, piston 34 will also be moved since it is integral therewith. The initial movement of the pistons will cause cylinder 18 to move with piston 34 due to the friction between the cup 49 and the cylinder wall. This movement of cylinder 18 will cause the end surface 26 of flange 21 to engage the yieldable member 25 and cut off any communication between the interior of cylinder 18 and casing 12. When this is accomplished, piston 34 will move relatively to cylinder 18 and develop fluid pressure which will be transmitted to the fluid motor 10 to operate the brake. As long as piston 34 is developing fluid pressure, cylinder 18 will be maintained in a position where surface 26 will engage the yieldable element 25 since the fluid under pressure within the cylinder will act on the end wall 20 of the cylinder and produce a force maintaining the cylinder in valve closing position.

The spring 41 for maintaining ring 39 seated on surface 40 is of such strength that seating will be maintained until the fluid pressure developed by the master cylinder device reaches a predetermined value, say, for example, one hundred pounds per square inch. When this occurs, the forces acting on the cup-shaped member 38 will be such as to move it to the left against the force of spring 41. When this occurs, fluid under pressure can flow into chamber 51 and act on piston 28 to move it to the right. As this piston moves to the right, valve element 44 will be acted on by spring 46 and moved to closed position, thereby trapping fluid in the chamber between wall 30 and piston 32. This trapped fluid will act as a solid block (the fluid being incompressible) and piston 34 will be moved by the fluid pressure acting on piston 28. Since piston 28 is larger than piston 34, a compounding action will be present causing the fluid pressure developed by piston 34 to be greater than that developed by the master cylinder device A. Consequently, the brakes will be applied with less pedal pressure than would be the case if the compounding action were not present.

When the master cylinder device is released, the parts of the compounding unit will return to the positions shown in the figures. The spring 35 will force piston 28 rearwardly until wall 30 again projects into the opening in wall 16 so ring 39 can engage surface 40. When this position is assumed, valve stem 45 will be re-engaged with the cylindrical extension 37 and valve element 44 opened. This will permit the trapped fluid to return to the master cylinder device and pistons 32 and 34 to move relatively to piston 28 until they assume their retracted positions. Cylinder 18 will be moved rearwardly by piston 34 engaging cap 19. This movement of cylinder 18 will cause surface 26 to become disengaged from the yieldable element 25 and again place the interior of the cylinder in communication with casing 12 and free contraction and expansion of the fluid in cylinder 18, conduit 9, and fluid motor 10.

From the foregoing description it is apparent that piston 34 is first moved by fluid pressure from the master cylinder device acting on a piston having an area smaller than piston 34. Due to the piston 34 being larger than piston 32, the volume of fluid moved by piston 34 will be greater than the volume of fluid displaced by the master cylinder device. Thus with small pedal travel it will be possible to actuate the fluid motors and bring the brake shoes into engagement with the drum. When the predetermined pressure is reached, which automatically causes a changeover, the larger area of piston 28 will be acted on by the master cylinder developed pressure to move piston 34. The volume of fluid now displaced by the master cylinder device will be greater than the volume of fluid displaced by piston 34. However, the fluid pressure developed by the master cylinder device will be less than that developed by piston 34. Thus the brakes will be operated by a fluid pressure greater than that being developed. If the area of piston 32 should be half that of piston 34 and the area of piston 28 twice that of piston 34, it will be seen that it will take two pounds of fluid pressure developed by the master cylinder device when initially operated to apply the brakes with one pound of fluid pressure but after the change-over takes place, the brakes will be applied with two pounds of pressure for every pound of pressure developed by the master cylinder device.

By providing the small passage 43 for fluid to enter the cup-shaped member 38, it will not be possible by a sudden and rapid actuating of the master cylinder device to cause unseating of ring 39 and actuation of piston 28 prior to piston 32 being moved. Thus it is not possible for piston 35 to be moved through its entire stroke by fluid pressure acting solely on piston 28.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, a fluid motor to be actuated, a cylinder, a piston in the cylinder, conduit means placing the cylinder in communication with the fluid motor, means for moving said piston by fluid pressure from the source acting on an area of a member operatively connected therewith, a second cylinder concentric with said piston and means for moving the piston by fluid pressure from the source acting on a member having a larger area, said last named means including a valve associated with said second cylinder operative only when the fluid pressure from the source is above a predetermined value.

2. In a fluid pressure system, a source of fluid pressure, a fluid motor to be actuated, a cylinder, a piston in the cylinder, conduit means placing the cylinder in communication with the fluid motor, a movable member connected to the piston and presenting an area to be acted on by fluid pressure, conduit means for causing fluid pressure from the source to act on the member, a second movable member presenting a larger area to be acted on by fluid pressure from the source, said first member being movable relatively to the second to move the piston when fluid pressure from the source acts on the area of the first member, means for causing fluid pressure from the source to act on the larger area but only when the pressure is above a predetermined value, and means for establishing a confined body of fluid between the members to permit the second member when moved to transmit force through the confined body to the first member and the piston.

3. In a fluid pressure system, a source of fluid pressure, a fluid motor to be actuated, a cylinder, a piston in the cylinder, conduit means placing the cylinder in communication with the fluid motor, a movable member connected to the piston and presenting an area to be acted on by fluid pressure, conduit means for causing fluid pressure from the source to act on the member, a second movable member presenting a larger area to be acted on by fluid pressure from the source, said first member being movable relatively to the second to move the piston when fluid pressure from the source acts on the area of the first member, pressure-controlled valve means for causing fluid pressure from the source to act on the larger area but only when the pressure is above a predetermined value, and means comprising valve means for establishing a confined body of fluid between the members to permit the second member when moved to transmit force through the confined body to the first member and the piston.

4. In a fluid pressure system, a source of fluid pressure, a fluid motor to be actuated, a cylinder, a piston in the cylinder, conduit means placing the cylinder in communication with the fluid motor, a fluid motor having two elements one of which is connected to operate the piston and capable of movement relatively to the other, conduit means for connecting the last named fluid motor to the source so that fluid pressure therefrom will move the relatively movable element and the piston, and means operable when the fluid pressure from the source reaches a predetermined value for trapping fluid in the last named fluid motor and for moving both elements thereof to move the piston.

5. In a fluid pressure system, a source of fluid pressure, a fluid motor to be actuated, a cylinder, a piston in the cylinder, conduit means placing the cylinder in communication with the fluid motor, a fluid motor having a cylinder and piston, means connecting the last named piston to operate the first piston, conduit means for connecting the last named fluid motor with the source so that fluid pressure therefrom will move the two pistons, a piston associated with the cylinder of the last named fluid motor, means operable when the fluid pressure from the source reaches a predetermined value for permitting the fluid pressure from the source to act on the last named piston, and means for trapping fluid in the cylinder of the last named fluid motor to thereby cause the cylinder and piston of the last named fluid motor and also the first piston to be simultaneously moved by the last named piston.

6. In a fluid pressure system, a source of fluid pressure, a fluid motor to be actuated, a cylinder, a piston in the cylinder, conduit means placing the cylinder in communication with the fluid motor, a fluid motor having a cylinder and piston, means connecting the last named piston to operate the first piston, conduit means for connecting the last named fluid motor with the source so that fluid pressure therefrom will move the two pitsons, a piston associated with the cylinder of the last named fluid motor, valve means operable when the fluid pressure from the source reaches a predetermined value for permitting fluid pressure from the source to act on the last named piston to move it, and valve means controlled by movement of the last named piston for trapping fluid in the last named fluid motor so that the first named piston will be moved by force from the last named piston transmitted through the trapped fluid.

7. In a fluid pressure system, a source of fluid pressure, a fluid motor to be actuated, a cylinder, a piston in the cylinder, conduit means placing the cylinder in communication with the fluid motor, a second cylinder, a second piston in the second cylinder and operatively connected to the first piston, a third piston for moving the second cylinder, a third cylinder for the third piston, conduit means for connecting the second cylinder with the source to thereby cause fluid pressure therefrom to simultaneously move the second and first pistons, and valve means associated with said third cylinder and piston for causing fluid pressure from the source to be effective only in the third cylinder when the fluid pressure is above a predetermined value to thereby move the third piston.

8. In a fluid pressure system, a source of fluid pressure, a fluid motor to be actuated, a cylinder, a piston in the cylinder, conduit means placing the cylinder in communication with the fluid motor, a second cylinder, a second piston in the second cylinder and operatively connected to the first piston, a third piston for moving the second cylinder, a third cylinder for the third piston, conduit means for connecting the second cylinder with the source to thereby cause fluid pressure therefrom to simultaneously move the second and first pistons, means including pressure-operated valve means for connecting the third cylinder with the source but only when the fluid pressure from the source is above a predetermined value, and valve means closed by initial movement of the third piston for trapping fluid in the second cylinder.

9. In a fluid pressure system, a source of fluid pressure, a fluid motor to be actuated, a cylinder, a piston in the cylinder, conduit means placing the cylinder in communication with the fluid motor, a second cylinder, a second piston in the second cylinder and operatively connected to the first piston, a third piston carried by the second cylinder for moving said cylinder, a third cylinder for the third piston, a spring for biasing the first, second and third pistons to retracted positions, conduit means connecting the source with the second cylinder, valve means carried by the second cylinder for controlling the last named conduit means, means operable by the spring for maintaining said valve means open only when the third piston is in retracted position, and means comprising pressure-operated valve means for connecting the third cylinder with the source to thereby cause the third piston and second cylinder to be moved when the fluid pressure from the source is above a predetermined value.

10. In a fluid pressure system, a source of fluid pressure, a fluid motor to be actuated, a cylinder, a piston in the cylinder, conduit means placing the cylinder in communication with the fluid motor, a second cylinder, a second piston in the second cylinder and operatively connected to the first piston, a third piston for moving the second cylinder, a third cylinder for the third piston, conduit means for connecting the second cylinder with the source to thereby cause fluid pressure therefrom to simultaneously move the second and first pistons, means comprising valve means for controlling the connection of the source with the third cylinder to move the third piston, a spring for biasing the valve means closed, means for opening the valve means when the fluid pressure from the source is above a predetermined value, and valve means disconnecting the second cylinder from the source when the third piston is moved.

11. In a fluid pressure system, a source of fluid pressure, a fluid motor to be actuated, a casing, a cylinder mounted in the casing for limited reciprocable movement, valve means controlled by movement of the cylinder for controlling communication between the cylinder and casing, conduit means for placing the cylinder in communication with the fluid motor, a piston in the cylinder, means for causing movement of the cylinder to close the valve means when the piston is initially moved, means for moving the piston by fluid pressure from the source and comprising means carried by the piston and presenting an area to be acted on by said fluid pressure, another piston having a large area operable in a cylinder fixed in said casing and valve means associated with said last mentioned piston and cylinder operable when the fluid pressure from the source is above a predetermined value for causing the first mentioned piston to be moved by fluid pressure acting on said larger area.

12. In a fluid pressure system, a source of fluid pressure, a fluid motor to be actuated, a casing, a cylinder mounted in the casing for limited reciprocable movement, valve means controlled by movement of the cylinder for controlling communication between the cylinder and casing, conduit means for placing the cylinder in communication with the fluid motor, a piston in the cylinder, means for causing movement of the cylinder to close the valve means when the piston is initially moved, a second piston connected with the first piston for simultaneous movement, means for causing fluid pressure from the source to act on the second piston to move the first piston, a third piston having an area greater than either the first or second piston, and means for causing fluid pressure from the source to act on the area of the third piston and move the first piston when the pressure from the source is above a predetermined value.

13. In a fluid pressure system, a source of fluid pressure, a fluid motor to be actuated, a casing, a cylinder mounted in the casing for limited reciprocable movement, valve means controlled by movement of the cylinder for controlling communication between the cylinder and casing, conduit means for placing the cylinder in communication with the fluid motor, a piston in the cylinder, means for causing movement of the cylinder to close the valve means when the piston is initially moved, a second cylinder, a piston therein connected with the first piston, a third piston carried by the second cylinder, conduit means for permitting fluid pressure from the source to enter the second cylinder and act on the piston therein, and means operable when the fluid pressure from the source reaches a predetermined value for trapping fluid under pressure in the second cylinder and permitting fluid pressure from the source to act on the third piston only.

14. In a fluid pressure system, a source of fluid pressure, a fluid motor to be actuated, a casing, a cylinder mounted in the casing for limited reciprocable movement, valve means controlled by movement of the cylinder for controlling communication between the cylinder and casing, conduit means for placing the cylinder in communication with the fluid motor, a piston in the cylinder, means for causing movement of the cylinder to close the valve means when the piston is initially moved, a second piston connected with the first piston for simultaneous movement, means for causing fluid pressure from the source to act on the second piston to move the first piston, a third piston having an area greater than either the first or second piston, pressure-operated valve means for permitting fluid pressure from the source to act on the area of the third piston when the pressure from the source is above a predetermined value to thereby move said third piston, and means for confining a body of fluid between the second and third pistons when the third piston is moved so that force may be transmitted from the third piston to the first piston without movement of the third piston relatively to the second and first pistons.

STEVE SCHNELL.